(12) United States Patent  
Sebastian

(10) Patent No.: US 9,389,684 B2  
(45) Date of Patent: Jul. 12, 2016

(54) PLATFORM FOR FINGER CONTROLS

(71) Applicant: Visual Music Systems, Inc., Boston, MA (US)

(72) Inventor: William B. Sebastian, Falmouth, MA (US)

(73) Assignee: VISUAL MUSIC SYSTEMS, INC., Boston, MA (US)

( * ) Notice: Subject to any disclaimer, the term of this patent is extended or adjusted under 35 U.S.C. 154(b) by 68 days.

(21) Appl. No.: 14/204,834

(22) Filed: Mar. 11, 2014

(65) Prior Publication Data

US 2014/0274397 A1    Sep. 18, 2014

Related U.S. Application Data

(60) Provisional application No. 61/851,781, filed on Mar. 13, 2013.

(51) Int. Cl.
*A63F 9/24* (2006.01)
*G06F 3/01* (2006.01)

(52) U.S. Cl.
CPC ...................................... *G06F 3/014* (2013.01)

(58) Field of Classification Search
CPC . A63F 13/06; A63F 2300/105; A63F 13/212; G06F 3/014
See application file for complete search history.

(56) References Cited

U.S. PATENT DOCUMENTS

| | | | |
|---|---|---|---|
| 4,986,280 A | 1/1991 | Marcus et al. | |
| 5,764,164 A * | 6/1998 | Cartabiano | A63F 13/06 273/148 B |
| 5,796,354 A * | 8/1998 | Cartabiano | G06F 3/014 273/148 B |
| 6,049,327 A | 4/2000 | Walker et al. | |
| 6,110,130 A | 8/2000 | Kramer | |
| 6,413,229 B1 | 7/2002 | Kramer et al. | |
| 7,042,438 B2 | 5/2006 | McRae et al. | |
| 7,839,383 B2 | 11/2010 | Li et al. | |
| 8,601,614 B2 | 12/2013 | Scaff | |
| 2003/0048312 A1* | 3/2003 | Zimmerman | A61B 5/1114 715/863 |
| 2006/0097453 A1* | 5/2006 | Feldman | A63F 13/06 273/304 |
| 2010/0041521 A1 | 2/2010 | Ingvast et al. | |
| 2010/0234182 A1* | 9/2010 | Hoffman | A61B 5/1125 482/8 |
| 2010/0311546 A1 | 12/2010 | Kupferman | |
| 2011/0209599 A1 | 9/2011 | Aponte | |
| 2012/0266358 A1* | 10/2012 | Yuen | A61B 5/7475 2/162 |
| 2012/0270655 A1* | 10/2012 | Crisco, III | A63F 13/06 463/36 |
| 2013/0165832 A1 | 6/2013 | Kuo | |

* cited by examiner

*Primary Examiner* — Steve Rowland
(74) *Attorney, Agent, or Firm* — Marsh Fischmann & Breyfogle LLP

(57) ABSTRACT

A hand-mounted controller is provided that allows a user to manipulate individual sensors associated with one or more, and typically each, of a wearer's fingers and thumb while monitoring movement of the controller in three dimensional space. The controller includes a palm grip that may be affixed to the hand via straps. Attached to the palm grip is one or more finger actuated controls and one or more thumb actuated controls. A position sensor detects the position and orientation of the hand. The palm grip is contoured to distribute pressure across the carpals and the four finger metacarpals, while providing clearance so as not to interfere with the finger metacarpophalangeal joints and/or the thumb carpometacarpal joint.

17 Claims, 14 Drawing Sheets

PLATFORM FOR FINGER CONTROLS

CROSS-REFERENCE

This application claims the benefit of the filing date of U.S. Provisional Application No. 61/851,781 having a filing date of Mar. 13, 2013, the entire contents of which is incorporated herein by reference.

FIELD

This disclosure relates in general to human-actuated control systems and more specifically to control systems that use 6D hand position tracking while allowing fingers of a user to control independent sensors/actuators.

BACKGROUND

A number of existing hand held controllers allow users to manipulate associated computerized systems through movement of their hand and/or fingers. Game controllers like the Nintendo Wii or Razer Hydra provide six dimension (i.e., 6D) position tracking in a module which is held by fingers and thumb. Because the fingers and thumb are used to secure the device, independent simultaneous operation of linear controls by all fingers and thumb is difficult if not impossible and the range of finger movements is limited. Data gloves like the Nintendo Power Glove or 5DT Data Glove by Fifth Dimension Technologies can allow concurrent independent input from all fingers but have difficulties providing the optimal haptics. If the resistance against finger pressure is provided via a support anchored to the arm, the wrist mobility needed for orientation control is lost. Achieving a stable platform that allows for identifying fine movements of the fingers/thumb is difficult to achieve with prior art systems.

SUMMARY

Aspects of the presented inventions are directed to a novel hand-mounted controller that allows a user to manipulate individual sensors associated with one or more, and typically each, of a wearer's fingers and thumb. Certain aspects of the invention are based on the recognition that a finger control can express a wider range of values if the sensor can take advantage of the broad range of movements of which the finger is capable and of the ability of the fingers to exert varying amounts of force pressing downward and/or pulling inward. That is, a finger sensor can be controlled more precisely if the sensor occupies a constant position relative to the base of the finger and provides haptic feedback as to the current position of the fingertip relative to the sensor geometry. This requires a stable platform that can keep the sensors in this constant position as forces are applied to the controls. That is, if the platform is stabilized, forces applied by a finger tend to register with the finger sensor(s) as opposed to displacing the controller.

In a first aspect, a controller is provided that includes a palm grip that may be affixed to the hand via straps, one or more attached platforms for finger actuated controls (e.g., finger platform), an attached platform for thumb actuated controls (e.g., thumb platform), and a sensor detecting the position and orientation of the hand. The palm grip is contoured to distribute pressure more evenly across the carpals and the four finger metacarpals, while providing clearance so as not to interfere with the finger metacarpophalangeal joints and/or the thumb carpometacarpal joint. Straps at either end of the palm grip (e.g., forward end, rearward end) apply pressure holding the grip against the palm without interfering with the flexibility of the finger metacarpophalangeal joints, the thumb carpometacarpal joint and/or movement of the wrist. When tightened, these substantially inelastic straps clamp the palm grip in two locations so as to provide a stable base to which the finger and/or thump can be attached. The finger platform(s) is attached to and supported by the palm grip and contains sensors responding to pressure and/or position of one or more of the fingers. The thumb platform is attached to and supported by the palm grip and contains sensors responding to pressure and/or position of the thumb. The finger and thumb platforms may be fixedly attached to the palm grip. Alternatively, these platforms may be adjustably attached to the palm grip such that their positions may be adjusted by a user. Further, the platforms may be contoured to the curvatures of the fingers or thumb, respectively, or may be substantially planar. A position sensor (e.g., 6D sensor) can be mounted to a bottom surface of the palm grip or platforms and/or be embedded within the palm grip. Alternatively, the position sensor may be mounted to the straps on the back of the hand. The output of all sensors is sent to a computing system either via cables or via a wireless communication device.

DETAILED DESCRIPTION

Reference will now be made to the accompanying drawings, which at least assist in illustrating the various pertinent features of the presented inventions. The following description is presented for purposes of illustration and description and is not intended to limit the inventions to the forms disclosed herein. Consequently, variations and modifications commensurate with the following teachings, and skill and knowledge of the relevant art, are within the scope of the presented inventions. The embodiments described herein are further intended to explain the best modes known of practicing the inventions and to enable others skilled in the art to utilize the inventions in such, or other embodiments and with various modifications required by the particular application(s) or use(s) of the presented inventions.

In a human-actuated control system, increasing the number of vectors that may be concurrently controlled and/or monitored can improve performance in executing many complex tasks, such as performing music, playing a video game, or operating equipment. Attaching to the hand a sensor that detects XYZ position and 3 axis orientation (e.g., a six dimension or 6D sensor) provides a useful set of controls for many tasks, but performance can be further improved by allowing the fingers and thumb to provide independent control over additional vectors.

It has been recognized by the inventor that, in order to achieve enhanced orientation control, a user of a controller typically requires a full range of wrist movement, which prevents the use of the arm for supporting a device used to collect input from the fingers and thumb. That is, a device providing finger and thumb controls needs to derive its positional stability from the way in which it is attached to a hand of a user free of interfering with the movement of the wrist of the user. If the fingers or thumb are used to hold the device, they no longer can control independent vectors. So a means of securing the control apparatus to the hand is required.

The types of finger and thumb control that can be provided depend on the strength, rigidity, and stability of the mechanism used to secure the controller to the hand. If each finger needs only to press a single button, a simple mechanism such as a motion controller wand held in the hand can be adequate. However, the level of control that is possible can be improved by taking advantage of the full range of movement of the fingers and thumb and the ability to apply varying amounts of pressure at different locations. A controller that allows this type of input requires a strong, rigid and stable platform that resists pitch and roll forces applied by the fingers or thumb to corresponding finger or thumb sensors. To provide such a stable platform for a hand mounted controller, the presented controller utilizes an ergonomically shaped palm grip, which is secured to a palm of a user's hand.

Figure 1:
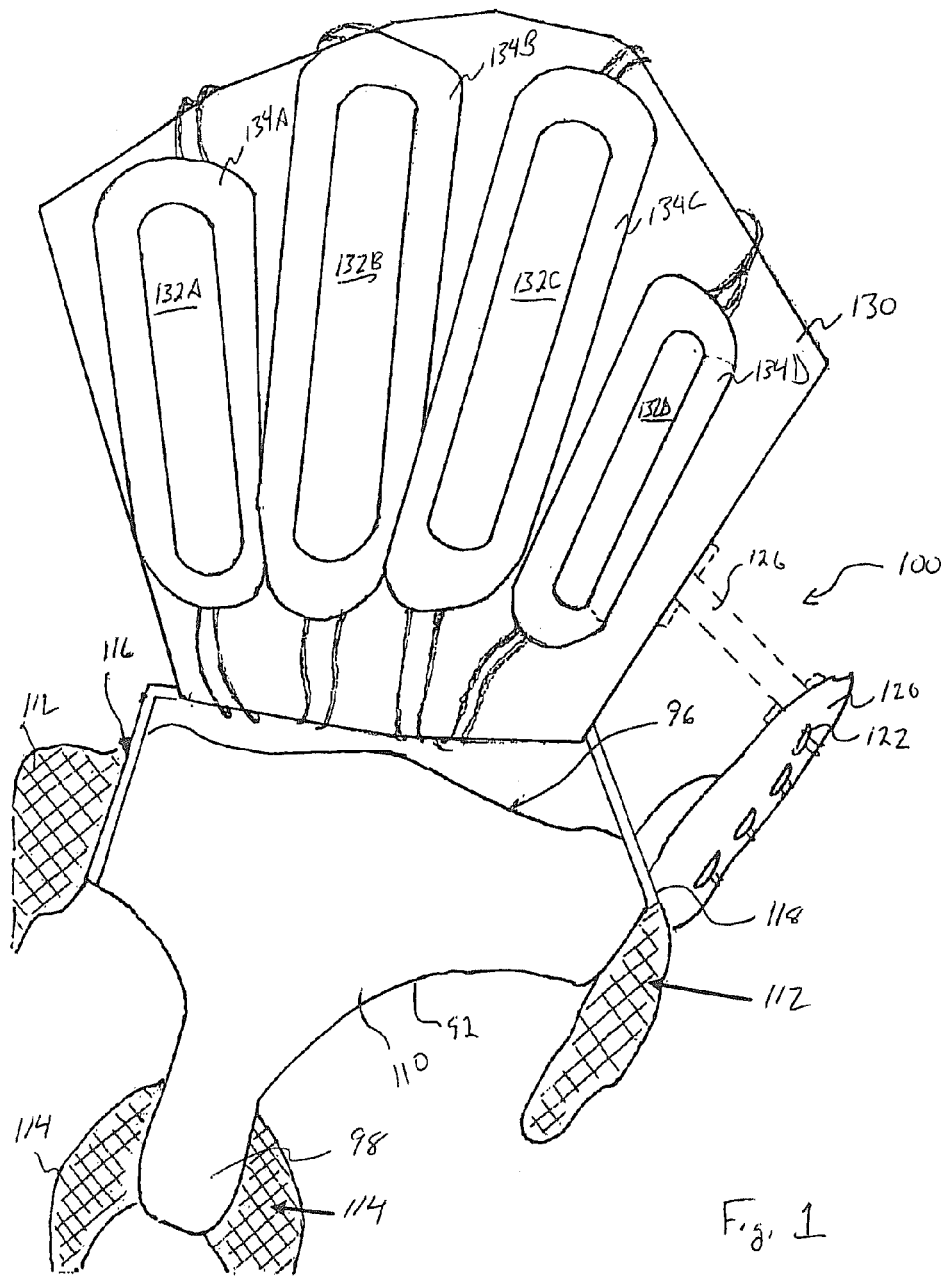
FIG. 1 illustrates a top view of a hand mounted controller apparatus for a left hand.
Figure 2:
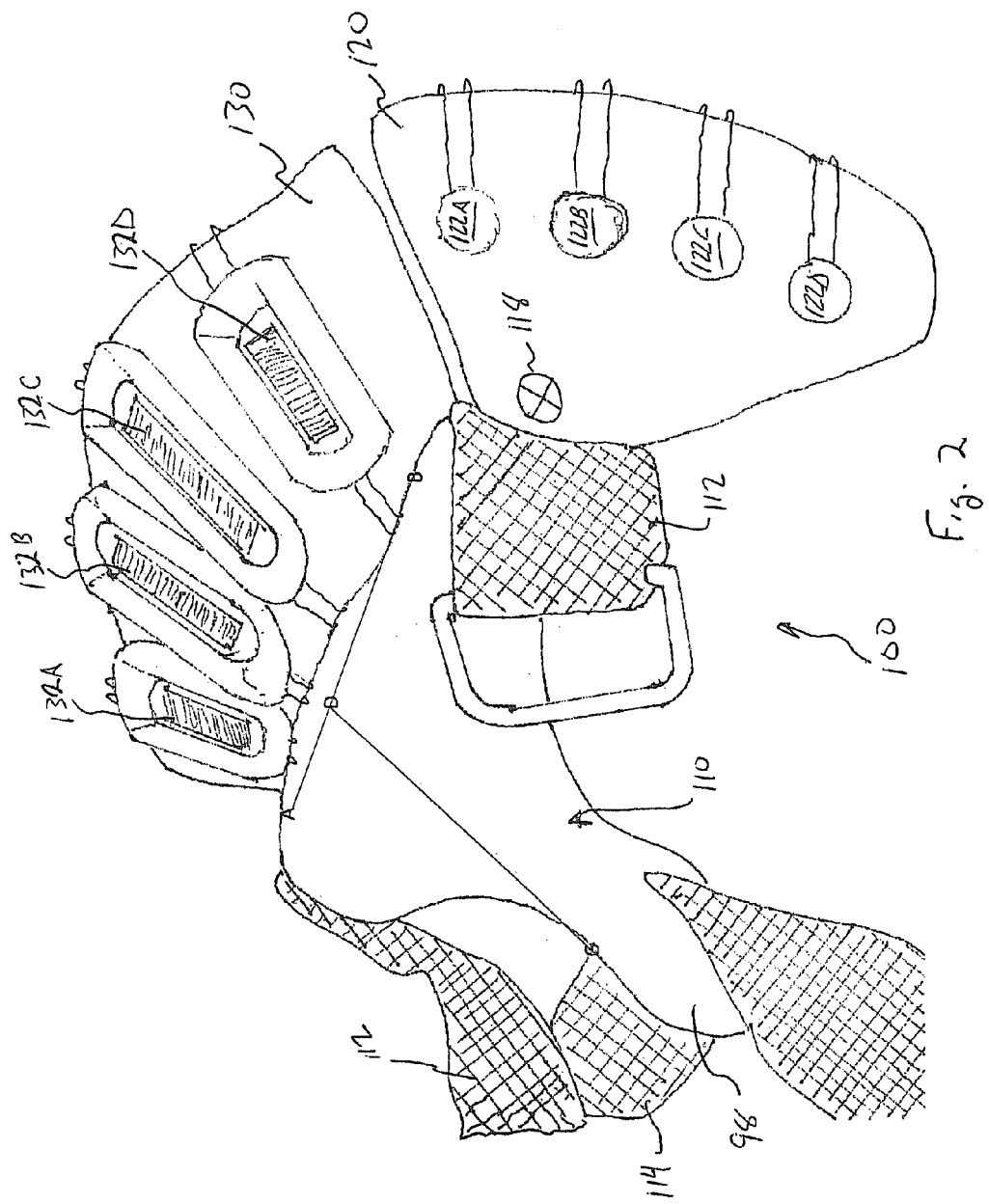
FIG. 2 illustrates a perspective view of the controller apparatus of FIG. 1.
Figure 3:
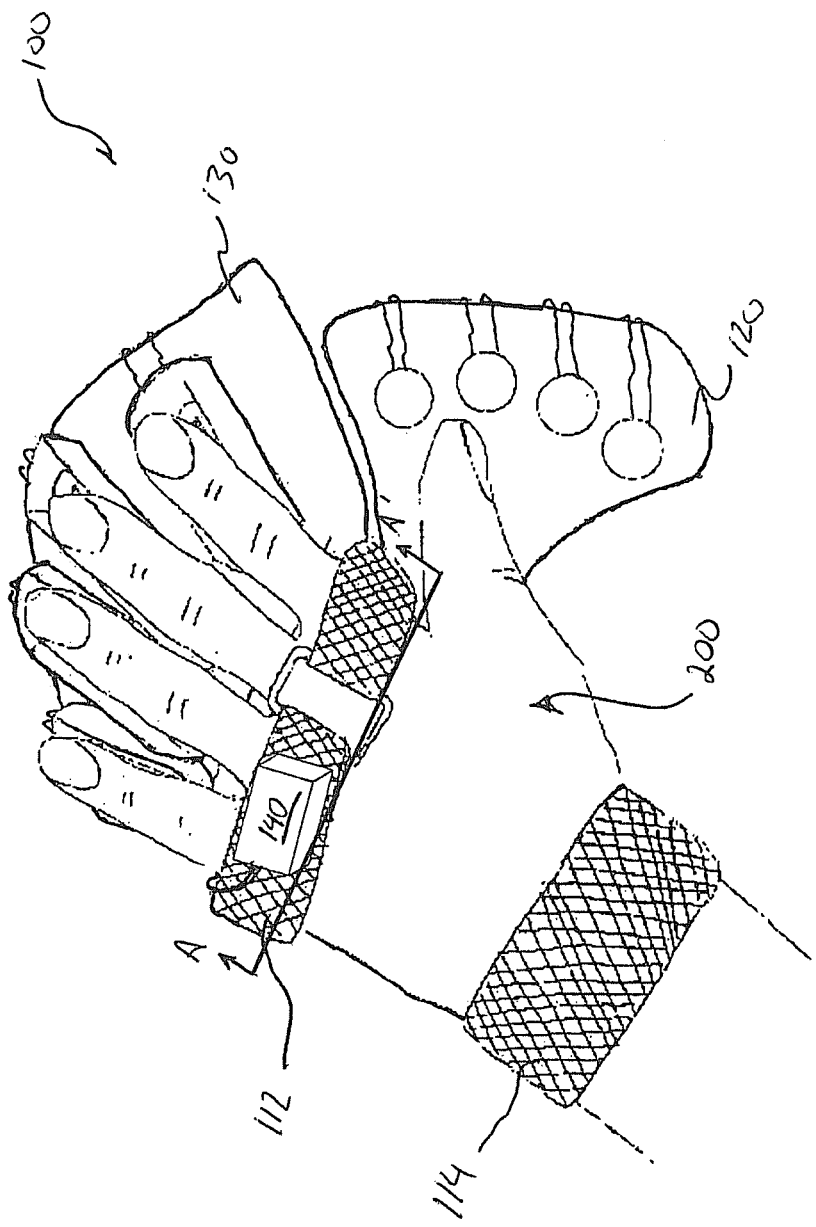
FIG. 3 illustrates a perspective view of the controller apparatus of FIG. 1 engaged with a user's hand.

FIGS. 1 and 2 illustrate top and perspective views of one simplified embodiment of a hand-mounted control apparatus 100 in accordance with various aspects of the presented inventions. FIG. 3 illustrates a perspective view of the control apparatus 100 as mounted to a hand 200 of a user. As shown in FIGS. 1-3, the control apparatus 100 includes a palm grip 110 that is adapted to be secured to a hand of a wearer. Specifically, the palm grip 110 is placed against the palm of the hand 200 of the wearer and is then secured in place by means of an upper strap 112 and a lower strap 114. The palm grip 110 provides a base on which two separate controller platforms are secured: a thumb platform 120 for thumb controls/sensors 122 and a finger platform 130 for finger controls/sensors 132. In the illustrated embodiment, the controller includes a single finger platform 130, however, other embodiments may utilize multiple individual finger platforms. The thumb platform 120 and the finger platform 130 are connected to a forward end 96 of the palm grip 110 in an orientation that allows a user's thumb and fingers to contact these platforms 120, 130. More specifically, the thumb and fingers of a user may engage controls/sensors 122 and 132 disposed on the platforms 120, 130, respectively.

The thumb platform 120 and the finger platform 130 attach to anchor points 116, 118 on the outside front edges of the palm grip 110. As shown, the thumb platform 120 is supported at an anchor point 118, which allows the platform 120 to be rotated so that the user can choose their most comfortable positioning. The location and orientation of the thumb platform is optimized for the range of movement of the thumb, which is independent of the positioning of the finger platform. In one embodiment, the thumb platform may have a concave curvature (not shown) so that sensors mounted flat on the surface are perpendicular to the direction at which force from the thumb will be applied. Such curvature may also expand the surface area of the platform that is easily reached by the thumb. The finger platform 130 is anchored to both anchor points 116 and 118. The finger platform 130 may also be rotated so that the user can choose their most comfortable positioning. Alternatively, the finger and thumb platforms can be rigidly attached to the palm grip.

Figure 4:
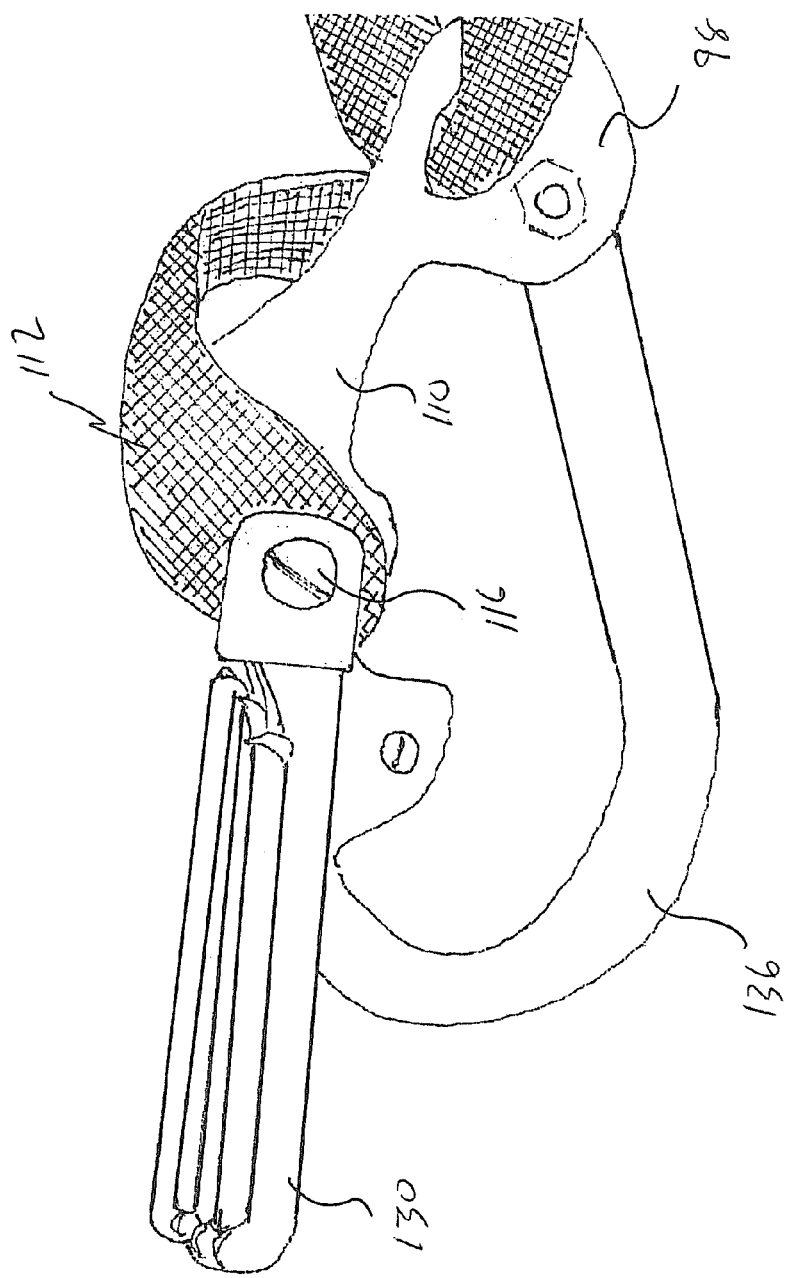
FIG. 4 illustrates a first side view of the controller apparatus.
Figure 5:
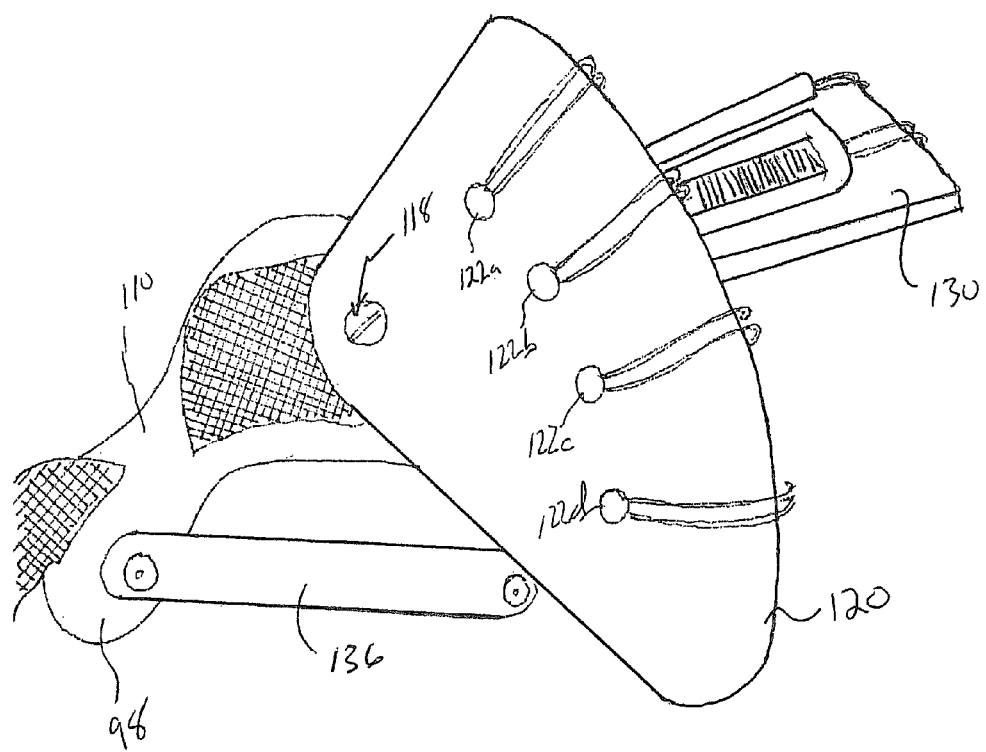
FIG. 5 illustrates a second side view of the controller apparatus.

To provide additional rigidity for adjustable platforms, 120, 130, each platform may further includes a brace that prevents rotation around the anchor points. For the finger platform, this brace connects the platform to the rearward or base end 98 of the palm grip 110. Referring to FIGS. 4 and 5, a finger platform brace 136 is shown extending between the rearward end 98 of the palm grip 110 and the bottom surface of the finger platform 130. This brace 136 prevents rotation at the anchor points 116 and 118 when the finger platform 120 is mounted to the palm grip 110. The length of the brace 136 may be adjusted as needed to support mounting of the finger platform at different angles. For the thumb platform 120, an optional brace 126 may extend between a distal portion of the thumb platform 120 and the finger platform 130. See FIG. 1. For non-adjustable mounting of the finger and thumb platforms, braces are not required. Further, it will be appreciated that the finger and thumb platform may be a single unitary structure in other embodiments.

The illustrated embodiment of the thumb platform 120 includes four actuator buttons 122A-122D (hereafter 122 unless specifically referenced). See FIGS. 1-3 and 5. In one embodiment, the actuator buttons are force sensitive resistors, however, this is not a requirement. The actuator buttons or controls 122 allow a user to selectively activate different functions of a controlled system based on the position and pressure of the thumb. As shown, the set of force sensitive resistor buttons are arranged so as to be at equal distances from the base of the thumb. Alternative embodiments can include other types of controls suitable for manipulation by the thumb. The finger platform 130 supports four finger controls 132A-132D (hereafter 132 unless specifically referenced). See FIGS. 1-3. In the illustrated embodiment, the finger controls consist of strips of force sensitive resistors (FSRs) that detect both the position at which the sensor is pressed by a finger and the amount of pressure being applied. The FSRs respond independently to both the location where pressure is applied and to the amount of pressure that is applied, so that each finger controls two linear parameter values. Guides 134A-D (hereafter 134 unless specifically referenced) may be placed on the sides and ends of the control sensors so that the finger stays in the middle of the sensor track and to provide an additional source of tactile feedback to the user. One non-limiting source of such force sensitive resistors is Interlink Electronics, Inc. of Camarillo, Calif., 93012.

The position and orientation of the hand 200 is determined by a sensor 140, which is independent of the finger and thumb controls. See FIG. 3. In one embodiment, the sensor 140 detects XYZ position and 3 axis orientation (e.g., a 6D sensor). One non-limiting source of such a 6D sensor is Sixense Entertainment, Inc of Los Gatos, Calif. 95030. Though shown and described as utilizing a single 6D sensor, it will be appreciated that multiple independent sensors may be utilized. In one embodiment, the sensor 140 is responsive to magnetic fields to determine position and orientation. Alternative embodiments use accelerometers to detect changes in velocity along the six axes and integrate to determine position. Other embodiments use visual or infrared sensors. In the embodiment illustrated in FIG. 3, the sensor 140 mounts to the back of the hand 200. Specifically, the sensor 140 is mounted to the upper strap 112. In another embodiment, the sensor 140 is recessed within the palm grip 110. See FIG. 9. In such an embodiment, the sensor 140 may be integrated into the palm grip 110 proximate to a natural rotational axis (e.g., pitch axis) of the hand of the wearer. Such an embodiment may result in a sensor that is less affected by small rotations of the platform than if the sensor(s) 140 were attached to the back of the hand of the wearer. Other attachments are possible, for instance, the sensor 140 may be attached to the bottom of the palm grip and/or platforms.

Figure 6:
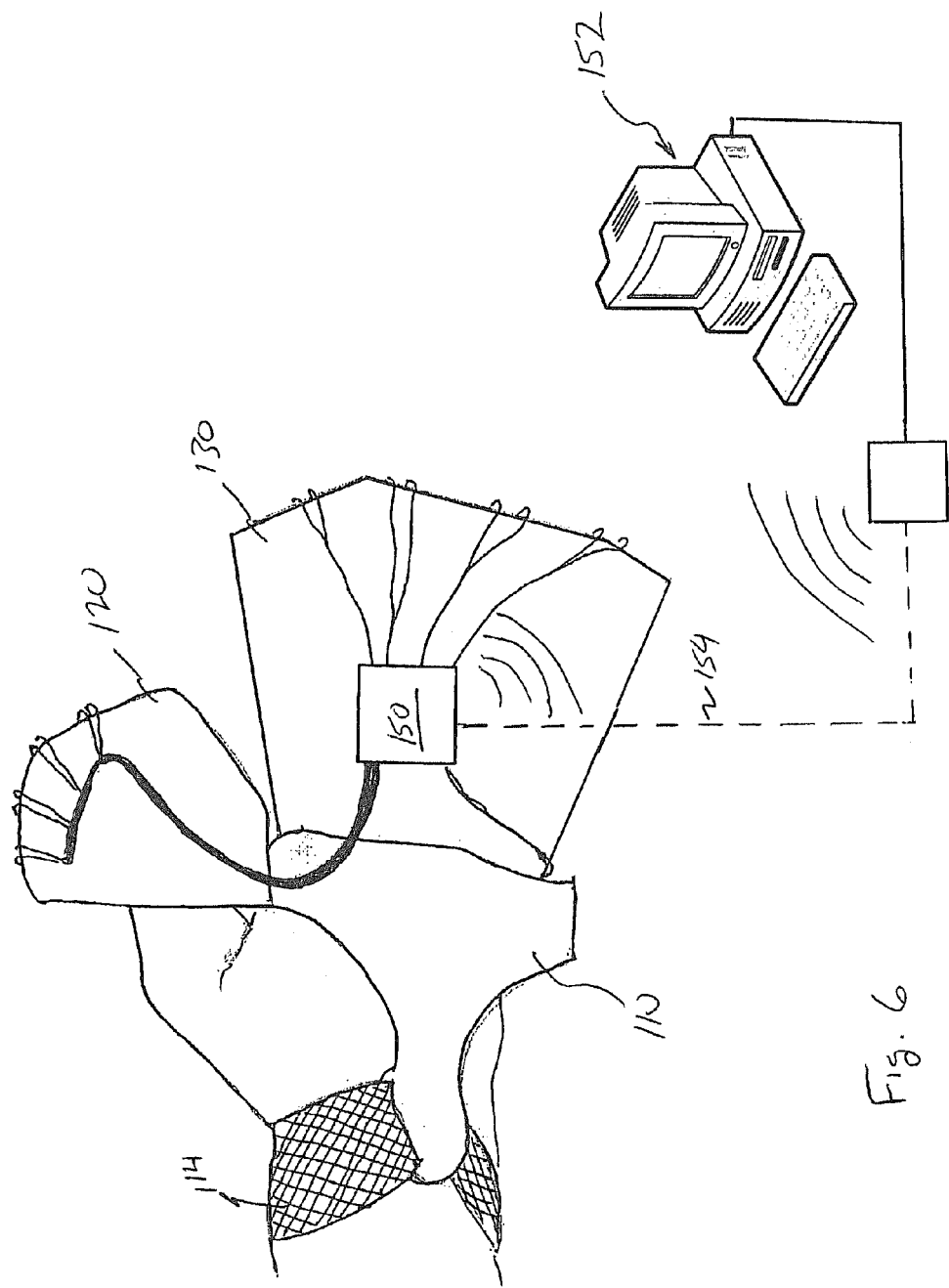
FIG. 6 illustrates a bottom view of the controller apparatus.

FIG. 6 shows the underside of the control apparatus 100 with the braces 126 and 136 removed for purposes of clarity. As shown, wiring from the thumb controls 122A-D, finger controls 132A-D and hand position sensor(s) 140 is routed into a control box 150 that contains analog to digital converters, preprocessing circuits for the position sensor(s), circuits for interfacing with USB or other network protocols, and other functions needed to preprocess the output signals of the sensors 122, 132 and 140 for transfer to a computing system 152. In the illustrated embodiment, the control box 150 is attached to the underside of the finger platform 130. In another embodiment, the control box may be remotely located between the control apparatus and the computing system. In such an embodiment, a length of cable extends between the sensors and the remote control box. Typically, such a cable will be long enough to allow full arm mobility relative to a fixed position of the control box. In one specific embodiment, a shielded cable is utilized to carry the sensor data (e.g., raw data) between the control apparatus and the control box. Such a shielded cable may reduce electromagnetic interference resulting in, for example, improved position sensing. In any embodiment, the control box 150 is in signal communication with the sensors and with the computing system 152, which may be controlled by the controller 100 and/or is in signal communication with a system being controlled. In one embodiment, the control box 150 connects to the computing system via a cable 154. Such a connection may utilize USB protocol. In another embodiment, the connection can be performed using wireless hardware and protocols such as Bluetooth. Other protocols, physical and wireless, are possible and considered within the scope of the presented inventions.

The computing system 152 may be any device configured to access computer readable code or program instructions from a computer readable medium and to execute program instructions using one or more processing units to process sensor outputs to determine orientation and/or finger/thumb inputs as well as generate outputs to control various systems including music systems, video games, operated equipment etc. Such computing systems can be, but are not limited to, personal computers, microcomputers, handheld devices, or a more advanced system such as a computer cluster, distributed computer system, server accessed over wired or wireless devices, a mainframe, a graphic processing unit, etc.

Figure 7:
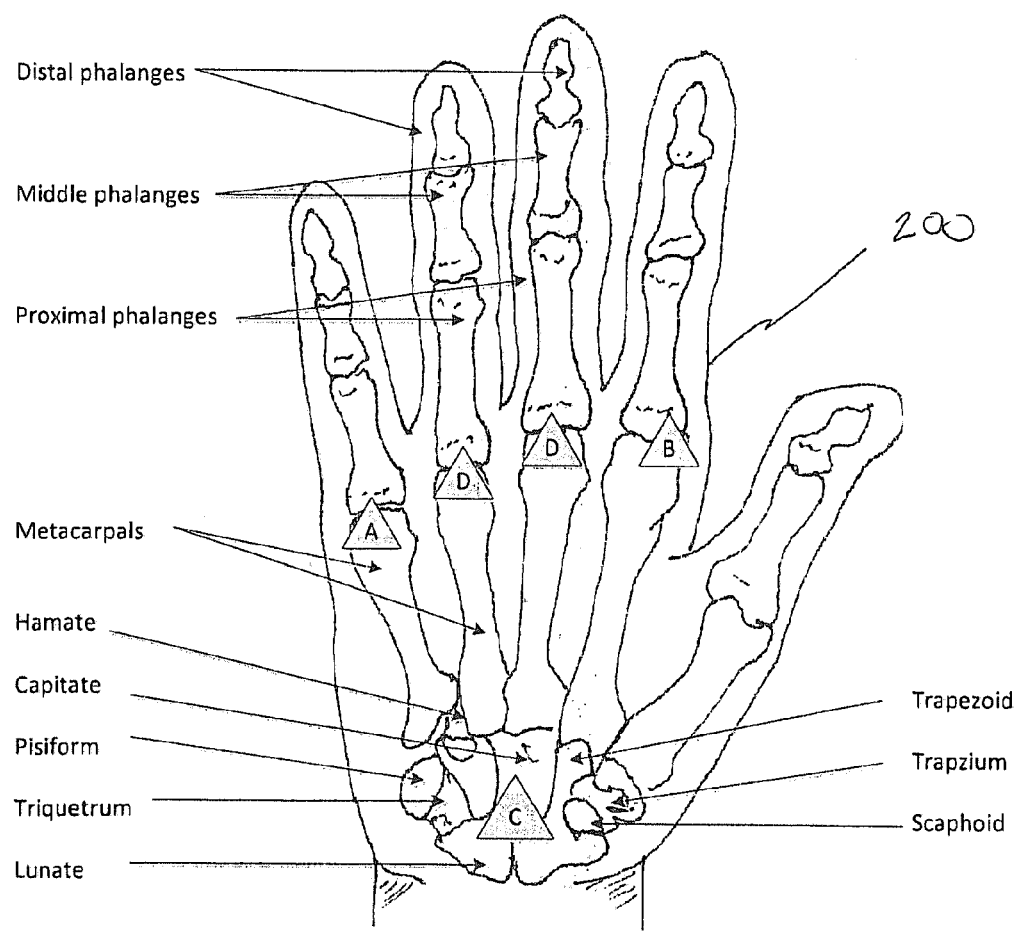
FIG. 7 illustrates support contact points relative to the bones of a hand.

It has been recognized that the physiology of the hand makes it difficult to provide a controller platform that provides a desired level of stability. The fingers need to retain full mobility at and above the metacarpophalangeal joints and the thumb needs to retain full mobility about the carpometacarpal joint, so little room is available for anchoring such a controller platform. That is, the palm of the hand is not a fixed bone, but rather consists of the individual metacarpals of each digit which move relative to each other and thus do not provide a stable area on which to secure the apparatus. FIG. 7 illustrates the bone structure of the hand 200 and also shows the relationship between contact points ADB and DC of the palm grip 110 as shown in FIG. 2 and the location of these contact points on the palm of the hand 200. In order to allow full movement of the fingers, the palm grip 110 is sculpted such that it does not interfere with the metacarpophalangeal joints. As shown in FIGS. 2 and 7, the contact points ADB of the palm grip 110 press against the tops of the metacarpals, as high as possible without interfering with the flexibility of the metacarpophalangeal joints. Contact points A and B are to the outsides of the joint centers to maximize the width of the support axis AB. Stated otherwise, the upper edge of the palm grip 110 extends nearly to the top or distal ends of the finger metacarpals stopping at the base of the metacarpophalange joints to obtain support from the metacarpal side of the joint without interfering with the flexibility of the proximal phalanges.

As shown in FIG. 3, when the two straps 112, 114 secure the palm grip 110 to the hand 200, the upper strap 112 wraps around the back of the hand just touching the base of the metacarpophalange joints, so as to be as far forward as possible without interfering with the flexibility of those joints. That is, the strap 112 is attached to first and second lateral edges of the palm grip and adjustably extends across the width of the palm grip. In the present embodiment, the top strap 112 is anchored to the palm grip 110 at the same anchor points 116, 118 used to attach the finger platform 130. The bottom strap 114 passes through the base end 98 of the palm grip 110 and wraps around the base of the carpals, being attached as far down as possible toward the arm without impeding the flexibility of the wrist. That is, contact point C is at the base of the carpals near the lunate. See FIGS. 2 and 7. Both straps are made of substantially inelastic material and are attached with buckles or other fasteners that can be secured tightly so as to clamp the contact points of the palm grip firmly against the hand bone structure.

Figure 8:
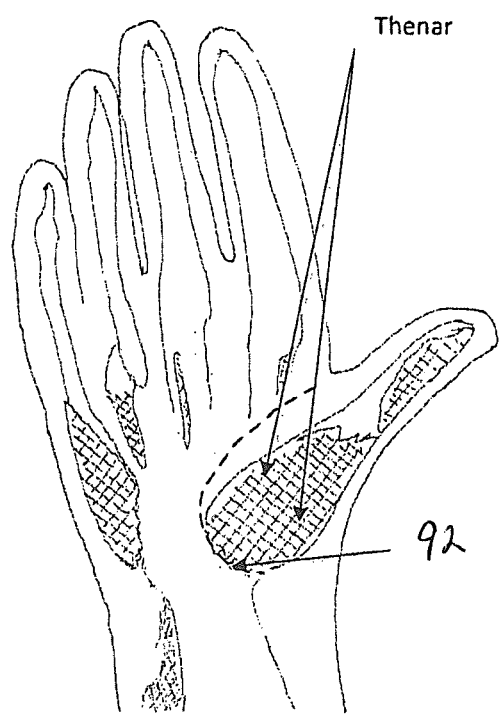
FIG. 8 illustrates required clearance around the Thenar of a hand.

In order to provide full movement of the thumb, the rearward end 98 of the palm grip 110 has a width that is less than the forward end 96 of the palm grip 110. Stated otherwise, the palm grip 110 generally defines a T-shaped body with the top or forward body portion of the T-shaped body having a width that is sized to extend laterally across a majority or entirety of the palm of a wearer's hand proximate to the distal ends of the metacarpals. In contrast, the rearward body portion (e.g., leg of the T-shaped body) extends longitudinally from the forward body portion along a portion of the length of a wearer's hand. The length of the rearward body portion is such that it terminates proximate to the carpals of the wearer's hand. To allow flexibility of the thumb, the leg of the T-shaped body is typically offset from the center of the center of the forward body portion. See FIG. 1. The reduced width and offset of the leg of the T-shaped body of the palm grip permits full movement of the thumb. Specifically, the palm grip is sculpted to provide clearance around the thenar muscle of the thumb so as not to interfere with the flexibility of the thumb. See FIG. 8. That is, the thumb side 92 of the palm grip 110 is cut away so as to provide clearance for the muscles surrounding the thumb carpometacarpal joint. As shown in FIG. 1, the thumb side 92 of the palm grip has a curvature that approximates the curvature of the thenar muscle. See FIGS. 1 and 8. The base end 98 of the palm grip 110 is anchored against the base of the carpal bones or carpals/carpus (e.g., hamate, pisiform, triquetrum, capitates, lunate, trapezoid, trapezium, scaphoid).

While the T-shaped palm grip is designed to permit free movement of the fingers and thumb, the surfaces of the palm grip are further contoured to provide resistance to torque forces applied to the palm grip. As will be appreciated, downward pressure on the finger controls 132, especially at the upper end of the finger platform 130, places substantial torque onto the palm grip: as much as 2-3 lbs. That is, pressure may be applied at a distance of 3-5 inches from where the finger platform 130 is attached to palm grip 110. If the palm grip 110 is not adequately secured to the palm of the hand 200 of the user, such pressure can result in movement of the palm grip 110 rather than actuation of the control/sensor 132. For instance, pressing near the upper end or distal tip of any of the finger controls 132 may impart a pitch force about axis AB of the palm grip 110. See FIG. 2. Likewise, pressing the outer controls 132A or 132D may impart a roll force about the long axis CD of the palm grip 110. Similarly, application of pressure to the thumb platform 120 may also impart forces (e.g., roll, pitch or yaw through a vertical axis; not shown) to the palm grip 110. If these roll, pitch and/or yaw forces are not counteracted, the palm grip 110 may move relative to the hand 200 thereby producing a less effective control/sensor response. For instance, when measuring an applied pressure to one of the finger controls 132, movement of the palm grip 110 relative to the hand may result in a lower pressure being applied to the finger control 132 reducing responsiveness of the controller 100. Accordingly, the palm grip 110 is contoured to the palm in order to effectively counteract forces applied to the palm grip 110 via the platforms 120, 130.

Figure 9:
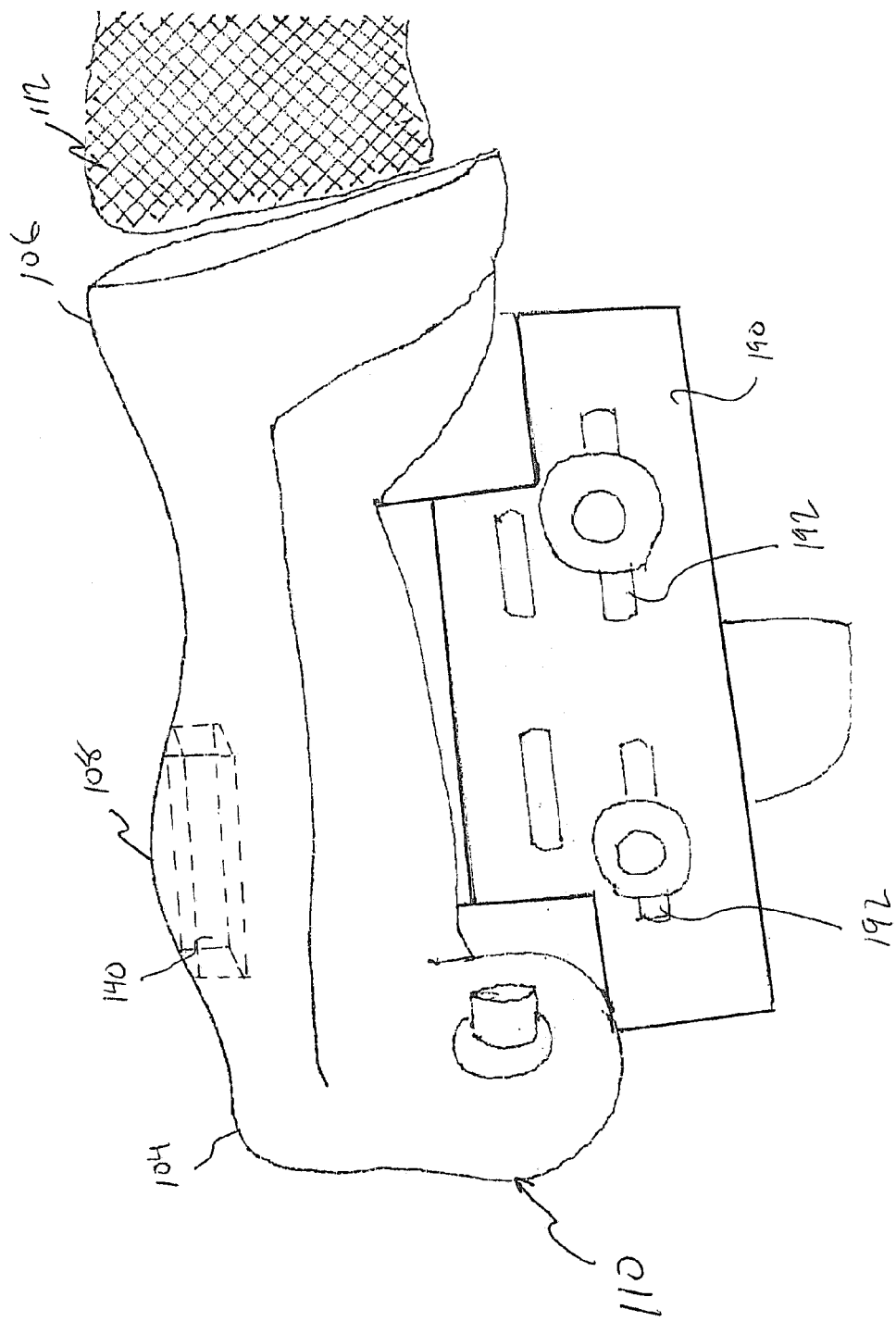
FIG. 9 illustrates a front end view of a palm grip of the controller apparatus.
Figure 10:
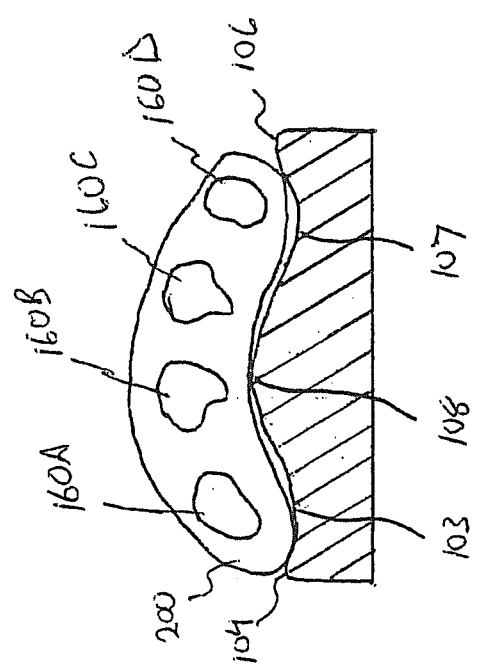
FIG. 10 illustrates a cross-sectional view of the contouring of the forward portion of the palm grip and user's hand taken along section lines A-A' of FIG. 3.

FIG. 9 shows a front end view of the palm grip 110 and FIG. 10 illustrates a cross sectional view of the hand 200 and palm grip 110 along section line A-A' of FIG. 3. As shown, the forward portion of the body of the palm grip 110 is contoured such that a central portion 108 of its top surface that bulges outward to touch the second metacarpal 160B and third metacarpal 160C, which tend to cup upward. This contouring of the palm grip 110 works to apply substantially equal pressure to all four metacarpals 160A-160D, so that motions of individual metacarpals have less impact on the palm grip position and on the resulting stability of the attached finger and thumb platforms. The line ADB of FIG. 2 follows the contour of the top surface of the palm grip. This contour ADB is raised at D to accommodate the cupping of the second and third metacarpals as best shown in FIGS. 9 and 10. In this regard, the contour ADB extends above a reference line or chord that passes through the lateral edges of the palm grip 110. In addition, the outside edges of the palm grip 110 each include a slight upward inflection 104 and 106. These upward inflections 104, 106 provide recesses in the contour line ADB of the top surface of the palm grip. Specifically, these upward inflections 104, 106 provide first and second recesses 103, 107 between the edges of the palm grip and the central portion 108 of the palm grip. These recesses 103, 107 that receive the outside metacarpals 160A and 160B, respectively.

Figure 11:
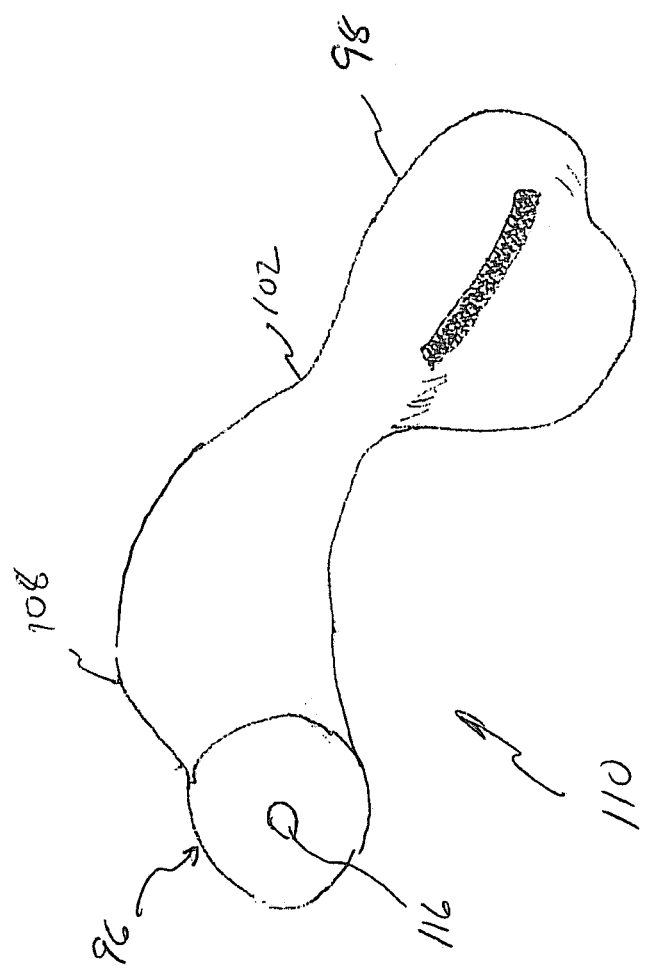
FIG. 11 illustrates a side view of the palm grip.

FIG. 11 illustrates a side view of the palm grip 110 with the platforms removed. As shown in FIGS. 2 and 11, the rearward body portion of the palm grip 110 is sculpted down between contact points D and C. This downward sculpting or recess 102 between the raised central portion 108 of the front end 96 of the palm grip 110 and the base end 98 of the palm grip provides clearance around the metacarpals. The upward sculpting of the base end 98 provides an anchor point at the base of the carpals. That is, the upward sculpting at the base end allows the leg of the T-shaped palm grip to contact the hand near base of the carpal bones without impeding movement of the metacarpal bones.

The greatest pressures on the palm grip 110 results when downward pressure is applied at the end of the finger sensors 132. Pressure at 132A or 132D applies a roll torque to the palm grip (i.e., about axes CD). See FIG. 2. The sculpting of the palm grip counteracts the roll about the CD axis. Specifically, the contour of AB is sculpted to insure that distance between the contact points at A and B are as wide as possible. The upward inflections 104 and 106 on the outside edges of the front end of the palm grip provide counteracting forces to be placed on the outsides of the outer metacarpals and increase the width of AB. Further, the upward bulge of the central portion 108 of the palm grip at D increases the overall contact area with the bone structure to make the palm grip 110 more rigid and better able to resist the roll torque about axis CD. Pressure at the tips of any of the finger sensors 132 also tend to push the palm grip away from the palm, which would cause the finger platform to move downward, which would be undesirable. That is, pressure at these points would tend to pitch the palm grip about axis AB. This is counteracted by the front strap 112 and the upward sculpting of the base end 98 of the palm grip, as illustrated in FIG. 11. That is, the leg of the T-shaped palm grip 110, when secured to the base of the palm, provides a lever arm that counteracts the forces applied to the tips of the finger sensors and thereby reduces pitch about axis AB.

To resist yaw forces applied to the palm grip (i.e., through a vertical axis perpendicular to AB and CD; not shown), a side tab may be added along a portion of the index finger. For instance, a small plate may be mounted where the thumb platform attaches to the palm grip that extends upward (toward the viewer at A' in FIG. 3) so that it presses against the first metacarpal, reducing sideways motion imparted when a user applies pressure to the thumb controls.

Figure 12:
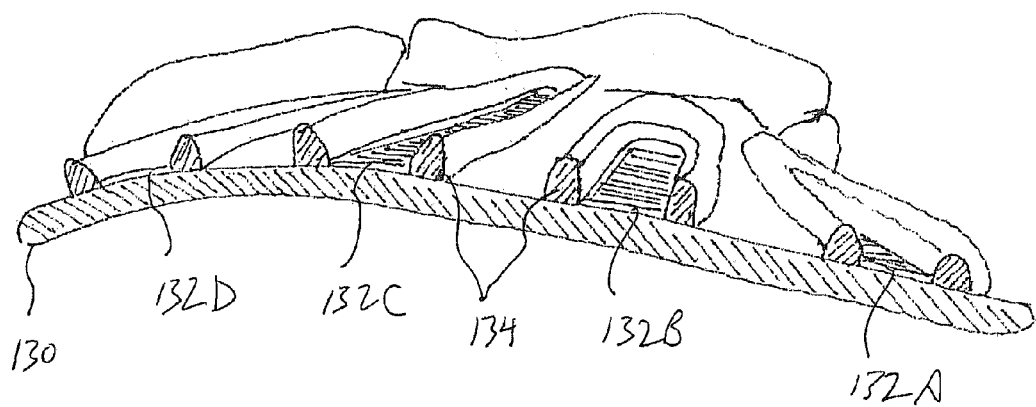
FIG. 12 illustrates curvature of the finger platform.

FIG. 12 provides additional detail of one embodiment of the finger platform 130. Specifically, FIG. 12 shows an embodiment where the curvature of the platform may align the control/sensors 132A-D with the most natural axis of each finger. Such curvature may be similar to that shown by metacarpals 160A-D in FIG. 10. Alternatively, the finger platform may be a flat surface without curvature. If the overall platform surface is curved, the area under each control/sensor 132 may be flattened so as to avoid bending the sensor when a FSR is utilized. In this regard, while each control/sensor 132 may define a linear axis, the linear axes of adjacent sensors need not be co-planar. The end view of FIG. 12 also shows the cross section of the finger guides 134 surrounding the sensors 132.

To further configure the finger platform 130 to a user's hand in an embodiment utilizing an adjustable platform, the lateral position of the finger platform may be adjusted. Referring again to FIG. 9, an adapter plate 190 may be attached to the front end of the palm grip. The plate 190 has horizontal slots 192 which allow sideways adjustment of the platform so that the curvature of the platform is best aligned with the user's hand. Likewise, the finger platform may have vertical slots which allow both up and down positioning and rotation of the finger platform relative to the palm grip.

Figure 13:
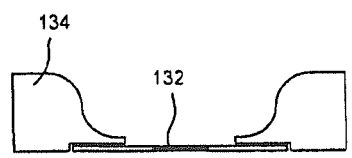
FIG. 13 illustrates a cross-section of finger guides.

FIG. 13 shows the cross section of the finger guides 134 in detail. The sides of the finger guide 134 are curved at the bottom to distribute the pressure over the full width of the sensor 132. In addition, the top of the finger guide may be rounded to guide a finger toward the sensor 132. In application to the finger platform, each sensor may be positioned based on the start/end range of motion of a particular finger of a particular user. In this regard, the lengths of the sensors may be selected for a particular user. That is, the sensors may come in different lengths. Alternatively, the sensors may have a uniform length and start and stop bumpers on the ends of the sensors may be adjustable. In such an arrangement, the start and end positions may be marked allowing a user to know their position along the sensor.

Figure 14:
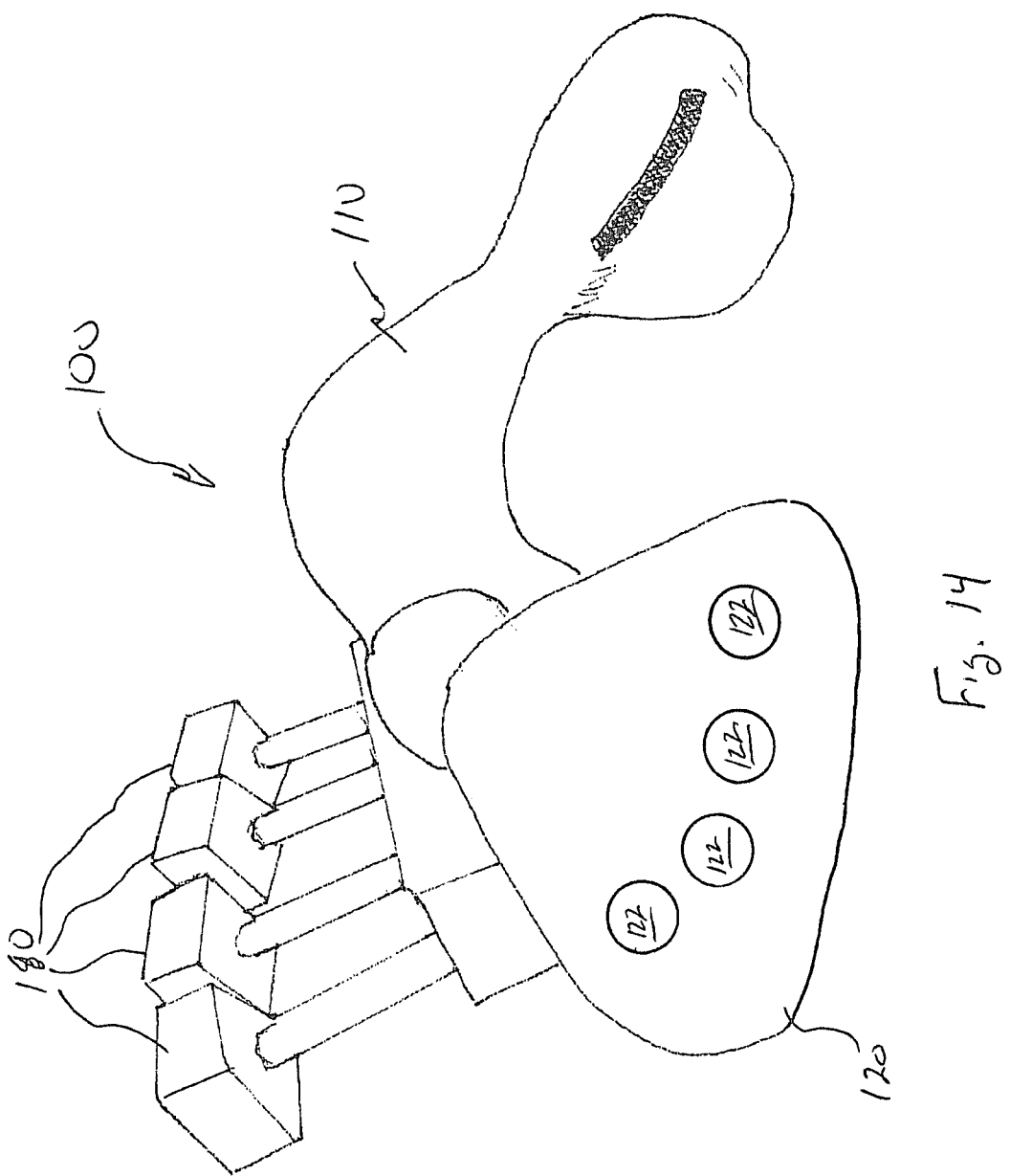
FIG. 14 illustrates an alternative right hand embodiment of the controller apparatus using linear potentiometers.

Though described above in relation to one specific embodiment, it will be appreciated that the controller apparatus may be modified while remaining within the scope of the presented inventions. For instance, FIGS. 1-3 illustrate a controller adapted for use with a user's left and which utilizes a finger platform. FIG. 14 shows a right hand controller apparatus 100 utilizing an alternative embodiment of a finger platform in which spring-loaded linear potentiometers 180 are used as the sensors. The potentiometers 180 are mounted to the platform at angles aligning to the natural finger positions when performing a squeezing motion. End caps of the potentiometers may have a concave curvature (not shown) at the end to hold the fingertips in position.

The foregoing description has been presented for purposes of illustration and description. Furthermore, the description is not intended to limit the inventions and/or aspects of the inventions to the forms disclosed herein. Consequently, variations and modifications commensurate with the above teachings, and skill and knowledge of the relevant art, are within the scope of the presented inventions. The embodiments described hereinabove are further intended to explain best modes known of practicing the inventions and to enable others skilled in the art to utilize the inventions in such, or other embodiments and with various modifications required by the particular application(s) or use(s) of the presented inventions. It is intended that the appended claims be construed to include alternative embodiments to the extent permitted by the prior art.

What is claimed is:

1. A hand mounted controller, comprising:
   a palm grip, having:
      a forward body portion sized to extend laterally across at least a portion of a width of a palm of a wearer proximate to the distal ends of the four finger metacarpals, wherein a top surface of said forward body portion is contoured between first and second lateral edges;
      a rearward body portion extending longitudinally along a portion of the length of the palm of the wearer from said forward body portion to a rearward end disposed proximate to a carpus of the hand of the wearer, wherein said forward body portion and said rearward body portion collectively define a T-shaped body, wherein said forward body portion forms a top of said T-shaped body and said rearward body portion forms a leg of said T-shaped body;
   a first strap attached to said forward body portion for disposition around the hand of a wearer proximate to the distal ends of the four finger metacarpals;
   a second strap attached to the rearward body portion for disposition around the hand of the wearer proximate to the carpus of the hand of the wearer;
   at least one sensor connected to said forward body portion of said palm grip and extending away from said forward body portion for selective engagement with one of a finger or thumb of the wearer;
   a position sensor connected to said controller, wherein said position sensor generates an output indicative of a location of said sensor in three dimensional space.

2. The apparatus of claim 1, wherein a mid-portion of said top surface of said forward body portion between said first and second lateral edges extends above a reference chord between said first and second lateral edges.

3. The apparatus of claim 2, wherein said top surface of said forward body portion further comprises an upward inflection disposed proximate at least one lateral edge of said forward body portion.

4. The apparatus of claim 1, wherein said leg of said T-shaped body is offset from a center of said top of said T-shaped body to provide clearance around the base of the thumb carpometacarpal joint.

5. The apparatus of claim 4, wherein a thumb side edge of said T-shaped body is curved to provide clearance about the thenar muscle of the thumb.

6. The apparatus of claim 1, further comprising:
   a finger platform attached to said forward body portion supporting at least a first finger sensor adapted for engagement by a finger of the wearer.

7. The apparatus of claim 6, wherein said finger platform supports four linear sensors adapted to be actuated by fingers of the wearer.

8. The apparatus of claim 7, wherein said linear sensors comprise force sensitive resistors mounted on said finger platform.

9. The apparatus of claim 8, wherein said force sensitive resistors provide separate outputs for position and pressure.

10. The apparatus of claim 6, wherein one or more linear potentiometers are mounted on said finger platform.

11. The apparatus of claim 6, wherein the position of said finger platform is adjustable relative to said forward body portion.

12. The apparatus of claim 6, further comprising:
   a thumb platform supporting at least a first sensor.

13. The apparatus of claim 1, wherein the position sensor is mounted to the palm grip.

14. The apparatus of claim 1, further comprising:
   a data collection unit for collecting data from said at least one sensor and said position sensor and outputting signals for receipt by a computer system.

15. A hand mounted controller, comprising:
   a palm grip, having:
      a forward body portion sized to extend laterally across at least a portion of a width of a palm of a wearer proximate to the distal ends of the four finger metacarpals, wherein a top surface of said forward body portion is contoured between first and second lateral edges; and
      a rearward body portion extending longitudinally along a portion of the length of the palm of the wearer from said forward body portion to a rearward end disposed proximate to a carpus of the hand of the wearer;
   a finger platform attached to said forward body portion supporting at least a first finger sensor adapted for engagement by a finger of the wearer, wherein the position of said finger platform is adjustable relative to said forward body portion.
   a first strap attached to said forward body portion for disposition around the hand of a wearer proximate to the distal ends of the four finger metacarpals;
   a second strap attached to the rearward body portion for disposition around the hand of the wearer proximate to the carpus of the hand of the wearer;
   at least one sensor connected to said forward body portion of said palm grip and extending away from said forward body portion for selective engagement with one of a finger or thumb of the wearer;
   a position sensor connected to said controller, wherein said position sensor generates an output indicative of a location of said sensor in three dimensional space.

16. A hand mounted controller, comprising:
   a palm grip, having:
      a forward body portion sized to extend laterally across at least a portion of a width of a palm of a wearer proximate to the distal ends of the four finger metacarpals, wherein a top surface of said forward body portion is contoured between first and second lateral edges;

a rearward body portion having a width less than a width of the forward body portion extending longitudinally along a portion of the length of the palm of the wearer from said forward body portion to a rearward end disposed proximate to a carpus of the hand of the wearer wherein said rearward body portion is offset from a center of said forward portion to provide clearance around the base of the thumb carpometacarpal joint;

a first strap attached to said forward body portion for disposition around the hand of a wearer proximate to the distal ends of the four finger metacarpals;

a second strap attached to the rearward body portion for disposition around the hand of the wearer proximate to the carpus of the hand of the wearer;

at least one sensor connected to said forward body portion of said palm grip and extending away from said forward body portion for selective engagement with one of a finger or thumb of the wearer;

a position sensor connected to said controller, wherein said position sensor generates an output indicative of a location of said sensor in three dimensional space.

17. The apparatus of claim 16, wherein a thumb side edge of said palm grip curves between a thumb side lateral edge of said forward body portion and the rearward end of said rearward body portion to provide clearance about the thenar muscle of the thumb.

* * * * *